United States Patent [19]

Golla et al.

[11] Patent Number: 5,802,346

[45] Date of Patent: Sep. 1, 1998

[54] METHOD AND SYSTEM FOR MINIMIZING THE DELAY IN EXECUTING BRANCH-ON-REGISTER INSTRUCTIONS

[75] Inventors: Robert Thaddeus Golla; Christopher Hans Olson, both of Austin, Tex.

[73] Assignee: International Business Machines Corporation, Armonk, N.Y.

[21] Appl. No.: 457,714

[22] Filed: Jun. 2, 1995

[51] Int. Cl.$^6$ ........................................... G06F 9/38
[52] U.S. Cl. ................. 395/500; 395/394; 395/580; 395/584
[58] Field of Search ........................ 395/500, 375, 395/800, 394, 580, 584

[56] References Cited

U.S. PATENT DOCUMENTS

| | | | |
|---|---|---|---|
| 4,760,519 | 7/1988 | Papworth et al. | 364/200 |
| 4,764,861 | 8/1988 | Shibuya | 364/200 |
| 4,853,840 | 8/1989 | Shibuya | 364/200 |
| 4,882,701 | 11/1989 | Ishii | 364/900 |
| 4,891,754 | 1/1990 | Boreland | 364/200 |
| 4,916,606 | 4/1990 | Yamaoka et al. | 364/200 |
| 4,991,086 | 2/1991 | Kojima | 364/200 |
| 5,043,868 | 8/1991 | Kitamura et al. | 364/200 |
| 5,127,091 | 6/1992 | Boufarah et al. | 395/375 |
| 5,333,281 | 7/1994 | Nishikawa et al. | 395/375 |
| 5,390,355 | 2/1995 | Horst | 395/800 |
| 5,396,604 | 3/1995 | DeLano et al. | 395/375 |
| 5,421,020 | 5/1995 | Levitan | 395/800 |
| 5,522,053 | 5/1996 | Yoshida et al. | 395/421.03 |
| 5,526,500 | 6/1996 | Tankalvala et al. | 395/375 |
| 5,553,255 | 9/1996 | Jain et al. | 395/375 |
| 5,560,032 | 9/1996 | Nguyen et al. | 395/800 |
| 5,603,047 | 2/1997 | Caulk, Jr. | 395/800 |
| 5,613,080 | 3/1997 | Ray et al. | 395/390 |
| 5,613,081 | 3/1997 | Black et al. | 395/403 |
| 5,664,135 | 9/1997 | Schlansker et al. | 395/377 |
| 5,706,491 | 1/1998 | McMahan | 395/581 |

OTHER PUBLICATIONS

C.J. Wang et al., Area and performance comparison of pipelined RISC processors implementing different precise interrupt methods, IEEE Proceedings, vol. 140, No. 4, pp. 196–200, Jul. 1993.

*Primary Examiner*—Kevin J. Teska
*Assistant Examiner*—A. S. Roberts
*Attorney, Agent, or Firm*—Sawyer & Associates; Casimer K. Salys

[57] ABSTRACT

A system and method for minimizing the delay associated with executing a register dependent instruction in which the execution of the register dependent instruction is dependent on an operand of a preceding instruction. In a branch unit for executing register dependent instructions, functional units are connected via a rename bus, and the functional units are connected to a general purpose register (GPR) via a GPR bus. The system and method routes the rename bus and the GPR bus directly to an instruction fetch address register thereby enabling the branch unit to execute a register dependent instruction during the same cycle as the preceding instruction.

13 Claims, 4 Drawing Sheets

METHOD AND SYSTEM FOR MINIMIZING THE DELAY IN EXECUTING BRANCH-ON-REGISTER INSTRUCTIONS

FIELD OF THE INVENTION

The present invention relates to a method and system for improving the performance of a processor and more particularly to a method and system for minimizing the delay associated with the execution of a branch instructions whose target address is register dependent.

BACKGROUND OF THE INVENTION

Most personal computer (PC) architecture instruction sets include branch instructions, which cause a program's execution to continue at a target address specified in the instruction. In certain types of PC architectures, the target address for the instruction is stored in two architected registers referred to as count and link registers.

Three types of branch instructions are used to specify target addresses; relative, non-relative, and branch-on-register. In a relative branch instruction, the target address is the address of the branch instruction plus an offset. In a non-relative branch instruction, the target address is the immediate address in the branch instruction. A branch-on-register instruction is subdivided into two instructions, a branch-to-count and a branch-to-link, in which the target address is the value stored in the count register and the value stored in the link register, respectively.

One way that count and link registers receive values is through the execution of move-to-count and move-to-link instructions. These instructions move a value called an operand found in a general purpose register (GPR) into the count and link registers, respectively. To branch to an address contained within a GPR, the execution of a move-to-count instruction is usually followed by the execution of a branch-to-count instruction. The move-to-count/branch-to-count instruction sequence is especially useful in the construction of branch tables since it provides a mechanism by which calculated target addresses can be branched to.

During the move-to-count/branch-to-count instruction sequence, the branch-to-count instruction is unable to execute until the value in the count register resulting from the move-to-count instruction becomes known. Instructions such as this are referred to as register dependent instructions since their execution cannot occur until a particular register obtains the target address for the instruction.

This is problematic in pipeline architecture, which attempts to keep hardware components as busy as possible by overlapping operations. To overlap operations, typical pipeline architectures include three overlapping operations that occur during the same processor cycle: a fetch cycle in which an instruction is fetched from memory; a dispatch cycle in which an instruction is sent to an execution unit; and an execution cycle where an execution unit executes an instruction.

When a branch is unable to occur because the target address is unavailable, the fetch cycle must be stalled until the target address becomes known. This causes the dispatch cycle to stall during the next cycle, which in turn, causes the execution cycle to stall the following cycle. Thus, previous architecture implementations must wait extra cycles while the move-to-count instruction is executed before executing the branch-to-count instruction, degrading overall system performance.

Accordingly, what is needed is a system and method for minimizing the delay associated with executing a move-to-count/branch-to-count instruction sequence. The present invention addresses such a need.

SUMMARY OF THE INVENTION

The present invention provides a method and system for minimizing the delay associated with executing register dependent instructions. The method and system comprises a branch unit for executing register dependent instructions, where the execution of the register dependent instruction is dependent on an operand of a preceding instruction. The branch unit further comprises an instruction fetch address register, an instruction buffer coupled to the instruction fetch address register, and a functional unit coupled to the instruction buffer for execution of the preceding instruction and the register dependent instruction. The branch unit also comprises a general purpose register and bus means connected between the functional unit and the general purpose register. The bus means further connects the functional unit and general purpose register to the instruction fetch register to provide the operand of the preceding instruction to the instruction fetch register as soon as the operand is available on the bus means.

According to the system and method disclosed herein, the present invention is capable of executing a register dependent instruction in the same cycle as the preceding instruction on which the register dependent instruction is dependent, thereby improving overall system performance.

DESCRIPTION OF THE INVENTION

The present invention relates to an improvement in executing register dependent instructions within a processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
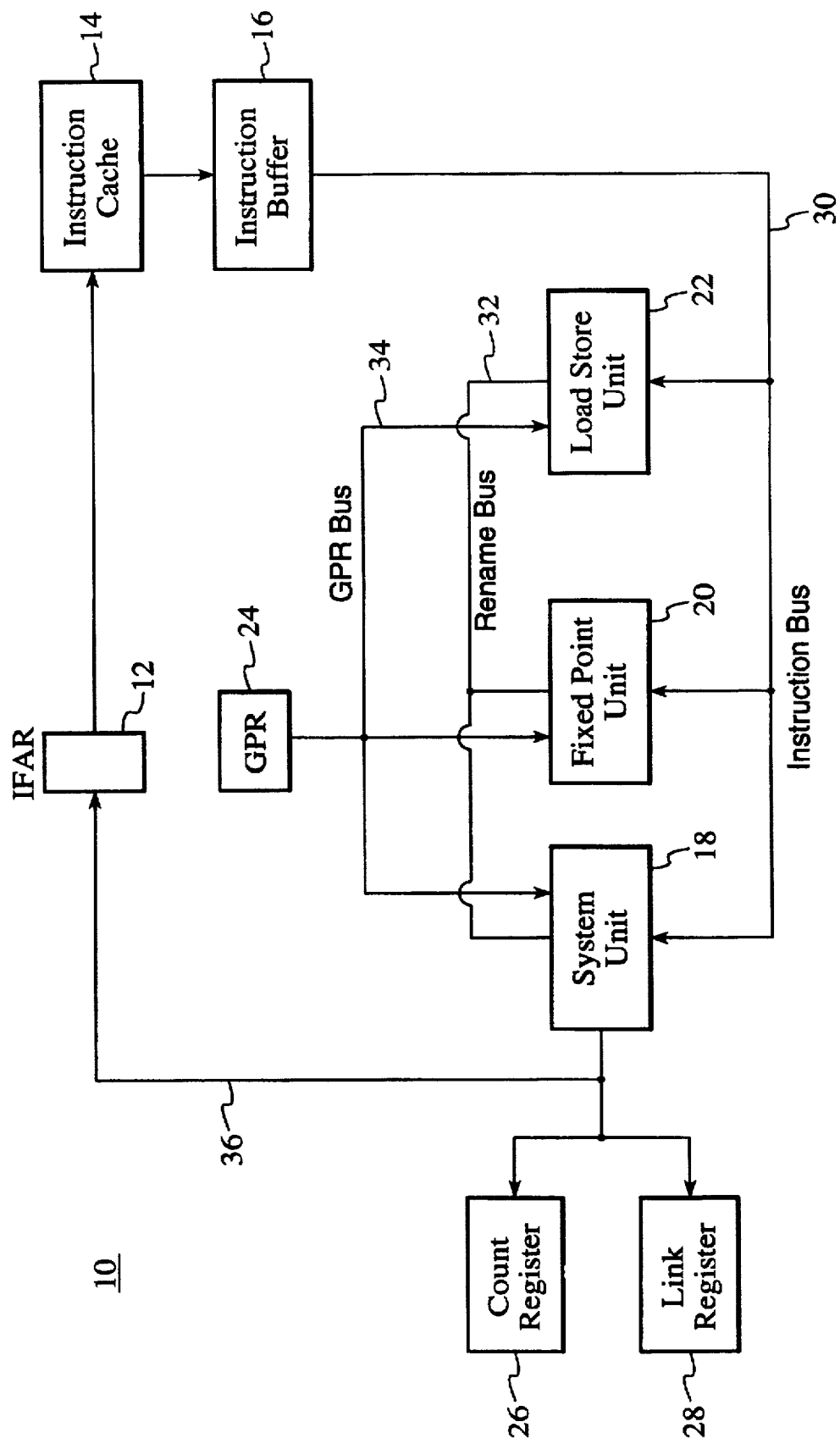
FIG. 1 is a block diagram of a conventional branch unit utilized in a processor.

FIG. 1 is a block diagram of a conventional microarchitecture implementation of a branch unit 10, which executes branch instructions. The branch unit 10 includes an instruction fetch address register (ifar) 12, an instruction cache 14, an instruction buffer 16, functional units 18–22, general purpose registers (GPRs) 24, a count register 26, and a link register 28.

The branch unit 10 operates as follows. During a fetch cycle, the instruction whose address is located in the ifar 12, is fetched from the instruction cache 14 and transferred to the instruction buffer 16. On the next cycle, the dispatch cycle, the instruction is transferred to an appropriate functional unit 18–22 for instruction execution during the execution cycle.

Functional units, such as system unit 18, fixed point unit 20, and load store unit 22, typically require one or more operands to execute a particular instruction. One or both operands may be obtained from the GPR register 24 via GPR bus 34 or from another functional unit 18–22 via a rename bus 32. After a functional unit 18–22 has finished execution, the result of the execution is either sent to the GPR register 24 for storage, or placed on the rename bus 32. The rename bus 32 is used to forward results of dependent operations (instructions which must be executed in sequence) to other functional units 18–22 as operands so that the functional units 18–22 may calculate a new result on the next cycle. Therefore, during an execution cycle, a functional unit 18–22 cannot execute until one or both operands are received either from the GPR register 24 or from the rename bus 32 as a result of a previous operation.

Although the GPR register 24, the GPR bus 34, and the rename bus 32 are shown in FIG. 1 as single entities, those with ordinary skill in the art will realize that the GPR register includes registers R0–R31, and that the rename bus includes 1–N rename buses.

As stated above, in order for the branch unit to execute a branch-to-count instruction, the branch-to-count instruction is preceded by the execution of a move-to-count instruction. The system unit 18 is the functional unit responsible for executing the move-to-count instruction on which the branch-to-count instruction is dependent. After the move-to-count instruction is dispatched to the system unit 18 via the instruction bus 30, the system unit 18 executes the move-to-count instruction by forwarding the instructions's operand (the target address) from the GPR bus 34 or the rename bus 32 to both the count register 28 and the ifar register 12.

Figure 2:
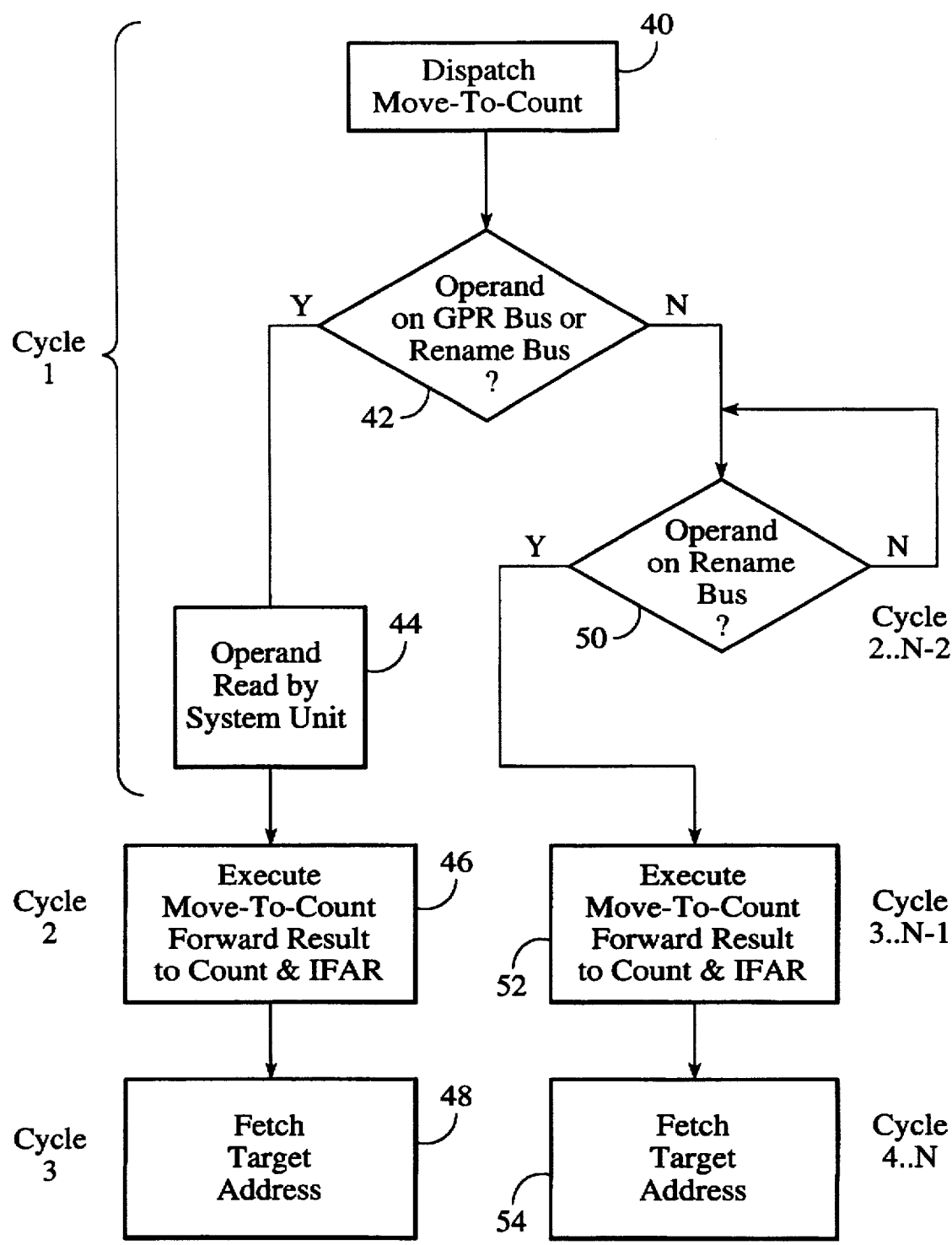
FIG. 2 is a is a flow chart depicting the cycle delays associated with the conventional execution of a move-to-count/branch-to-count instruction sequence.

Referring to FIG. 2, the cycle delays associated with the execution of the conventional branch unit's move-to-count/branch-to-count instruction sequence is shown. Referring to both FIGS. 1 and 2, the first cycle (cycle 1) of the sequence is shown in step 40 in which the move-to-count instruction is dispatched from the instruction buffer 16 to the system unit 18. If the rename bus 32 or the GPR bus 34 already contain the correct operand for the move-to-count instruction (step 42), then the operand is read by the system unit 18 (step 44).

The second cycle (cycle 2) is an execution cycle in which the system unit 18 executes the move-to-count instruction and forwards the operand to both the count register 26 and the ifar 12 via rename bus 36 (step 46).

The third cycle (cycle 3) is a fetch cycle in which the instruction at the location indicated by the value of the target address in the ifar 12 is fetched from the instruction cache 14 and placed into the instruction buffer 16 (step 48).

If the rename bus 32 or the GPR bus 34 does not contain the correct operand for the move-to-count instruction (step 42), then the system unit 18 must wait for the operand to appear on the rename bus 32 as the result of the execution of a previous operation by another functional unit 20–22 (step 50). This may occur on the next cycle or may occur many cycles away from the current cycle.

If the operand appears on the rename bus 32 on the next cycle (cycle 2), then the system unit 18 is able to execute the move-to-count instruction (step 52) during the third cycle (cycle 3). As a result, the system unit 18 forwards the operand (target address) to both the count register 26 and to the ifar register 12.

The last cycle (cycle 4) is a fetch cycle in which the instruction at the location indicated by the value of the target address in the ifar 12 is fetched from the instruction cache 14 and placed into the instruction buffer 16 (step 48).

In the event the system unit 18 has to wait for a number of cycles for the move-to-count operand to appear on the rename bus 32 in step 50, the execution of the move-to-count instruction in step 52 occurs one cycle before (cycle N−1) the target address is fetched in cycle N.

As shown in FIG. 2, when a conventional branch unit 10 executes a move-to-count/branch-to-count instruction sequence, at least two cycle delays are encountered from the time the move-to-count instruction is dispatched until the initiation of the fetch of the new target address specified in the branch-to-count instruction.

The present invention provides for a method and system for increasing overall system performance by minimizing the delay associated with the execution of register dependent instructions, such as a branch-to-count instruction, In some instances, the present invention is capable of executing a register dependent instruction in the same cycle as the preceding instruction on which the register dependent instruction is dependent. The present invention will be described in terms of a branch-to-count instruction sequence. However, one of ordinary skill in the art will readily recognize that this method and system will operate effectively for other types of register dependent instruction sequences, such as branch-to-link for example.

Figure 3:
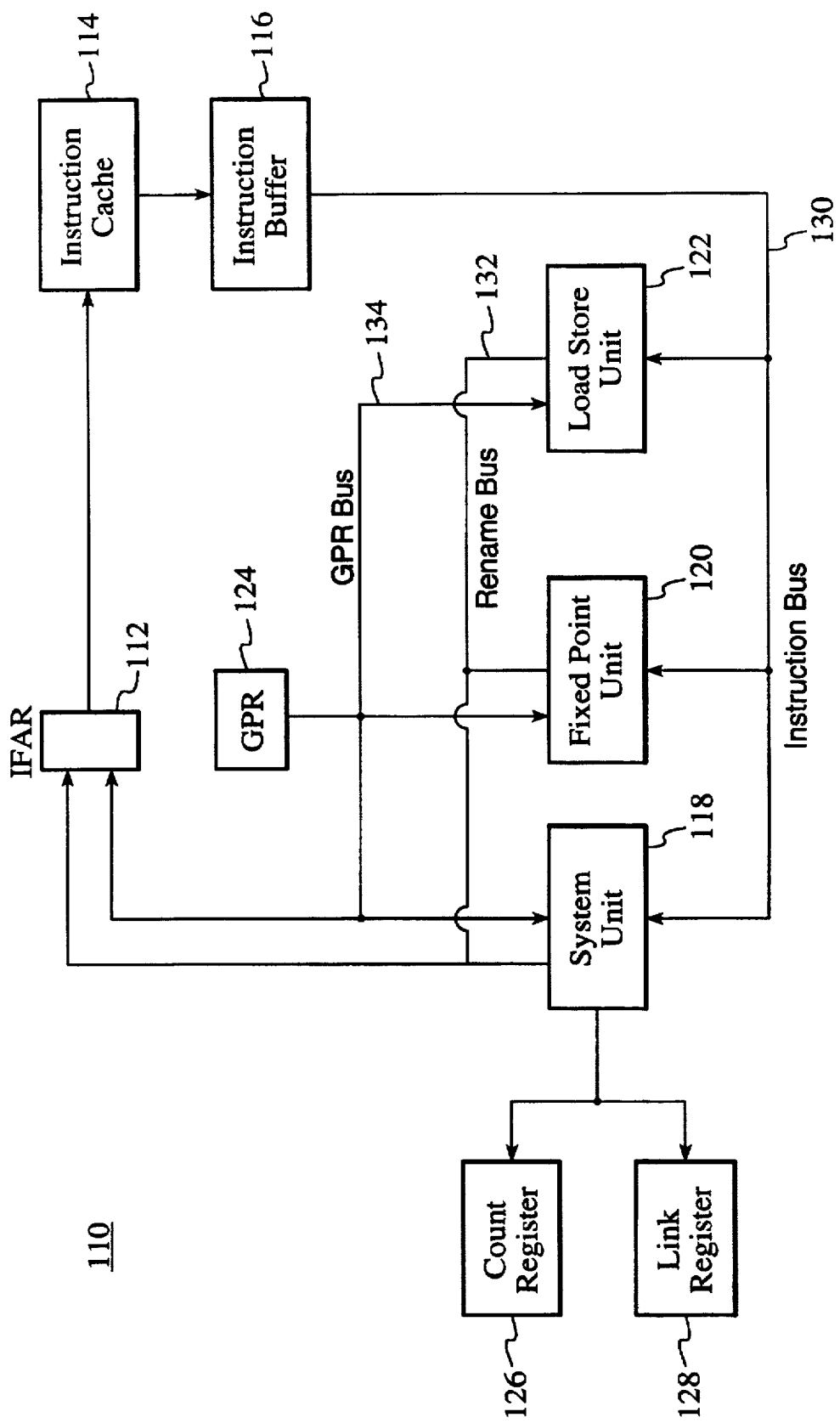
FIG. 3 is a block diagram of a branch unit in accordance with present invention.

To more particularly illustrate the branch unit system in accordance with the present invention, refer now to FIG. 3 depicting a block diagram of one embodiment of such a system. The branch unit 110 of the present invention includes an instruction fetch address register (ifar) 112, an instruction cache 114, an instruction buffer 116, functional units 118–122, and general purpose registers (GPRS) 124. In contrast to the conventional branch unit shown in FIG. 1, the branch unit 110 of the present invention reroutes both the rename bus 132 and the GPR bus 134 directly to the ifar 112.

The branch unit 110 of the present invention is capable of speculatively executing a branch-to-count instruction even if the target address of a move-to-count instruction is unknown. The branch unit 110 waits until the input operand is ready for the move-to-count instruction. Until the move-to-count operand is ready, no instructions are taken from the instruction cache 114 and placed into the instruction buffer 116. As soon as the input operand becomes available, the operand is routed into the ifar 112 via buses 132 and 134 and the branch-to-count instruction effectively executes. The target address of the branch-to-count instruction is fetched from the instruction cache 114 on the next cycle (provided it is contained in the instruction cache 114). Both the move-to-count and branch-to-count instructions execute once the input operand becomes available.

Figure 4:
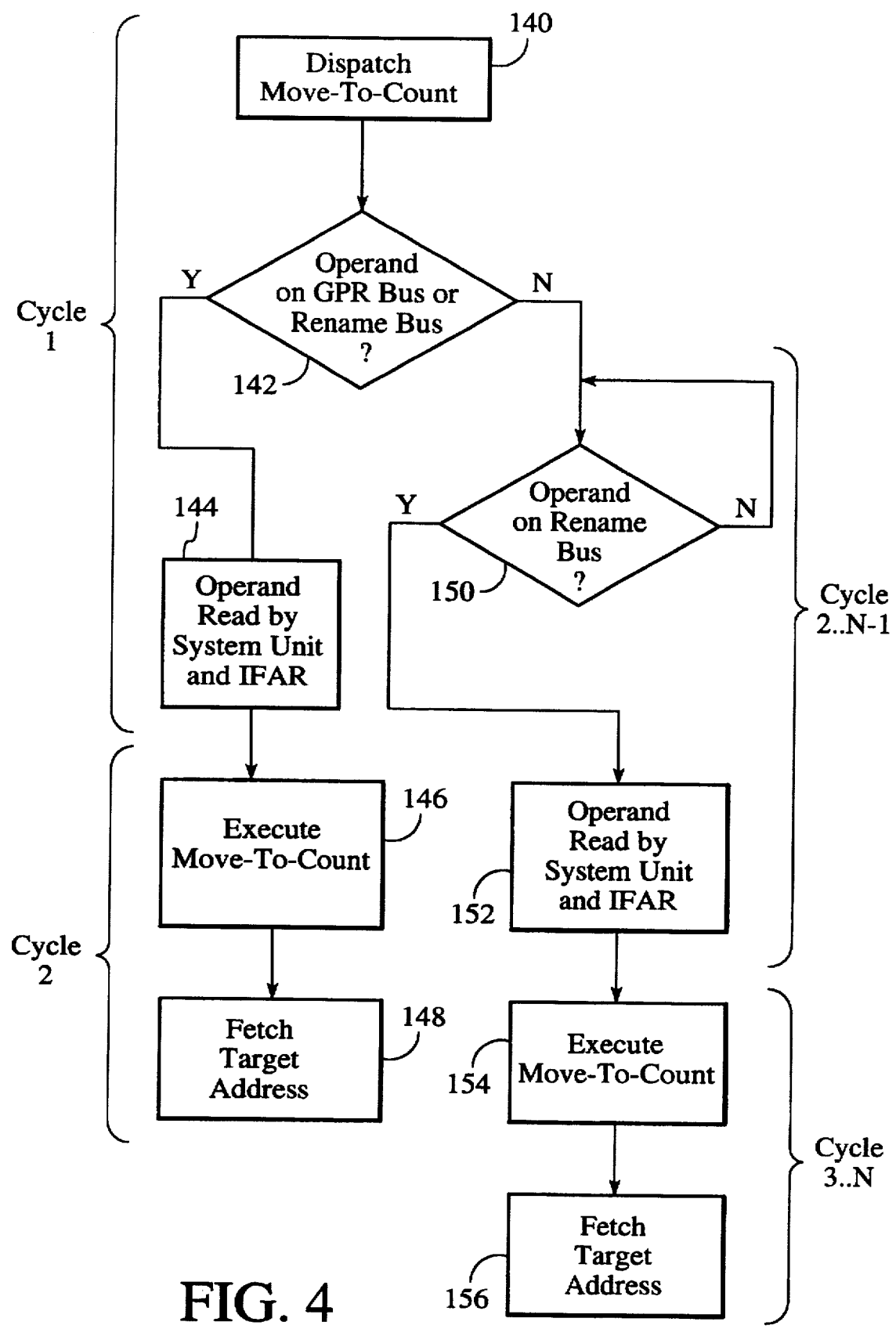
FIG. 4 is a flow chart depicting the cycles associated with the execution of a move-to-count/branch-to-count instruction sequence according to present invention.

FIG. 4 is a flow chart depicting the cycles associated with the execution of a move-to-count/branch-to-count instruction sequence according to present invention. Referring to both FIGS. 3 and 4, the first cycle (cycle 1) of the sequence is shown in step 140 in which the move-to-count instruction is dispatched from the instruction buffer 116 to the system unit 118. If the rename bus 132 or the GPR bus 134 already contain the correct operand for the move-to-count instruction (step 142), then the operand is read by both the system unit 118 and the ifar 112 from the rename bus 132 or the GPR bus 134 (step 144).

The second cycle (cycle 2) is an execution cycle in which the system unit 118 executes the move-to-count instruction (step 146). During the same cycle (cycle 2), the instruction at the location indicated by the value of the target address in the ifar 112 is fetched from the instruction cache 114 and placed into the instruction buffer 116 (step 148).

When the correct move-to-count operand is present on the GPR bus 134 or the rename bus 132 at the time the move-to-count instruction is dispatched, both the move-to-count and branch-to-count instructions execute during the second cycle (cycle 2). In prior art systems (see FIG. 2), the fetch of the target address (step 48) is forced to execute in the cycle following the execution of the move-to-count instruction (step 46). Thus, the branch unit 110 of the present invention eliminates one execution cycle compared to the conventional branch unit 10.

Referring again to FIGS. 3 and 4, if the rename bus 132 or the GPR bus 134 do not contain the correct operand for the move-to-count instruction (step 142), then the system unit 118 must wait for the operand to appear on the rename bus 132 as the result of the execution of a previous operation by another functional unit 20-122 (step 150). This may occur on the next cycle or may occur many cycles away from the current cycle.

If the operand appears on the rename bus 132 in step 150 on the next cycle (cycle 2), then both the system unit 118 and the ifar register 112 are able to read the operand (step 152) during the same cycle.

The third cycle (cycle 3) is an execution cycle in which the system unit 118 executes the move-to-count instruction (step 154). Since the value of the target address is now in the ifar 112, the instruction at the location indicated by the value of the target address in the ifar 112 is fetched from the instruction cache 114 and placed into the instruction buffer 116 (step 156) during the same cycle (cycle 3).

In this sequence where the operand for the move-to-count instruction was not present on the GPR bus 134 or the rename bus 132 in step 142, the branch unit 110 of the present invention eliminates one execution cycle from the conventional branch unit 10. That is, the system unit 118 is not required to execute the move-to-count instruction before the fetch of the target address occurs, as shown in cycles 3 and 4 of FIG. 2.

A method and system has been disclosed for increasing overall system performance by minimizing the delay associated with executing a register dependent instruction sequence. The present invention saves at least one cycle over previous methods. Simulations of applications that use branch tables, such as emulators, have shown a 10% improvement in overall system performance using the system and method disclosed herein.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A branch unit for minimizing the delay associated with executing a register dependent instruction, wherein the execution of the register dependent instruction is dependent on an operand of a preceding instruction, the branch unit comprising:

an instruction fetch address register;

at least two functional units for executing instructions;

a general purpose register;

a first bus for coupling the general purpose register, the functional units, and the instruction fetch address register; and a second bus for coupling the functional units and the instruction fetch address register, such that the operand of the preceding instruction is provided to the instruction fetch address register by one of the first bus and the second bus before the preceding instruction is executed by the functional units.

2. A branch unit as in claim 1 wherein one of the functional units is a system unit, wherein upon the preceding instruction being dispatched, if the operand of the preceding instruction is contained on either the first bus or the second bus, then the operand is read by the instruction fetch address register, and if the operand is not contained on either the first bus or the second bus, then the operand is placed on the second bus by one of the functional units and then read by both the system unit and the instruction fetch address register.

3. A branch unit as in claim 2 wherein when the instruction fetch address register reads the operand from the first bus or the second bus, the system unit also reads the operand.

4. A branch unit as in claim 3 wherein the first bus is a general purpose address bus and the second bus is a rename bus.

5. A branch unit as in claim 4 wherein the register dependent instruction is a branch-to-count instruction.

6. A branch unit as in claim 5 wherein the preceding instruction is a move-to-count instruction.

7. A branch unit as in claim 4 wherein the register dependent instruction is a branch-to-link instruction.

8. A branch unit as in claim 7 wherein the preceding instruction is a move-to-link instruction.

9. A method for minimizing the delay associated with executing a register dependent instruction sequence in a processor that has sequential processor cycles, wherein the register dependent instruction includes a target operand that is provided as a result of a preceding instruction, the method including the steps of:

a) connecting an instruction fetch register to a functional unit and to a general register with a first bus;

b) connecting the instruction fetch register to the functional unit with a second bus;

c) dispatching the preceding instruction;

d) if either the first bus or the second bus contains the target operand for the preceding instruction,
   i) reading the target operand into the instruction fetch register from the corresponding bus during a first cycle, and
   ii) fetching the target operand during a second cycle, e) if either the first bus or the second bus does not contain the target operand for the preceding instruction,
   i) waiting until the target operand is placed on the second bus, wherein the target operand is placed on the second bus during cycle N−1, and reading the target operand into the instruction fetch register from the second bus during cycle N−1, and
   ii) fetching the target operand during cycle N; and f) executing the preceding instruction in a cycle that occurs after reading the operand into the instruction fetch register.

10. The method of claim 9 wherein the register dependent instruction is a branch-to-count instruction.

11. The method of claim 10 wherein the preceding instruction is a move-to-count instruction.

12. The method of claim 9 wherein the register dependent instruction is a branch-to-link instruction.

13. The method of claim 12 wherein the preceding instruction is a move-to-link instruction.

* * * * *